(12) United States Patent
Findley et al.

(10) Patent No.: US 6,477,855 B1
(45) Date of Patent: Nov. 12, 2002

(54) CHILLER TANK SYSTEM AND METHOD FOR CHILLING LIQUIDS

(75) Inventors: David G. Findley, Palo Alto, CA (US); Brent Simmons, Palo Alto, CA (US)

(73) Assignee: Severn Trent Services - Water Purification Solutions, Inc, Ft. Washington, PA (US)

( * ) Notice: Subject to any disclaimer, the term of this patent is extended or adjusted under 35 U.S.C. 154(b) by 0 days.

(21) Appl. No.: 10/134,857

(22) Filed: Apr. 29, 2002

Related U.S. Application Data

(60) Provisional application No. 60/287,997, filed on May 1, 2001.

(51) Int. Cl.[7] .............................................. F25D 17/02
(52) U.S. Cl. ........................... 62/434; 62/50.1; 62/48.1; 62/79; 62/118
(58) Field of Search ................................. 62/50.1, 45.1, 62/79, 118, 434

(56) References Cited

U.S. PATENT DOCUMENTS

| | | | |
|---|---|---|---|
| 1,962,322 A | | 6/1934 | Murray et al. |
| 2,376,373 A | | 5/1945 | Merckel |
| 3,848,429 A | | 11/1974 | Franklin, Jr. |
| 4,020,690 A | | 5/1977 | Samuels et al. |
| 4,730,463 A | | 3/1988 | Stanfill |
| 4,977,953 A | | 12/1990 | Yamagishi et al. |
| 5,423,191 A | * | 6/1995 | Bennett ........................ 62/201 |
| 5,475,982 A | * | 12/1995 | Laude-Bousquet ............ 62/59 |
| 5,537,825 A | | 7/1996 | Ward |
| 5,544,489 A | | 8/1996 | Moren |
| 5,584,187 A | * | 12/1996 | Whaley ........................ 62/237 |
| 5,619,856 A | | 4/1997 | Lee |
| 5,699,669 A | | 12/1997 | Gebhard |
| 5,916,249 A | * | 6/1999 | Baker ............................ 62/85 |
| 6,003,318 A | | 12/1999 | Busick et al. |
| 6,112,541 A | | 9/2000 | Greene |
| 6,131,393 A | | 10/2000 | Greene |
| 6,230,516 B1 | * | 5/2001 | Andonian .................... 62/461 |
| 6,237,345 B1 | | 5/2001 | Kalman et al. |
| 6,272,879 B1 | * | 8/2001 | Lopez-Ordaz ............... 62/318 |

* cited by examiner

Primary Examiner—William C. Doerrler
Assistant Examiner—Mark Shulman
(74) Attorney, Agent, or Firm—Jo Katherine D'Ambrosio

(57) ABSTRACT

A chiller tank system for containment of chilled liquids comprises a first tank and a second tank position within the first tank. The first tank is spaced apart from the second tank so that insulation material can be positioned between them. The second tank defines a chamber for receiving the liquid to be chilled. A straight-lined, chiller barrel is positioned vertically within the chamber, the chiller barrel defining a bore connected to a flexible, dual hose. The straight-lined chiller barrel extends downward into the tank thereby evenly chilling the liquid to avoid thermal stratification that causes vaporization by creating warm spots within the liquid. A refrigeration unit supplies inert refrigerant to the tank. The dual hose circulates refrigerant between the refrigeration unit and the chiller barrel, the dual hose comprising an inner hose within an outer hose, the outer hose concentric to and spaced apart from the inner hose thereby creating two channels, one for transporting the refrigerant to the chiller barrel and the other for transporting the refrigerant away from the chiller barrel.

40 Claims, 2 Drawing Sheets

CHILLER TANK SYSTEM AND METHOD FOR CHILLING LIQUIDS

This is a continuation of U.S. Provisional Patent Application, Ser. No. 60/287,997 filed May 1, 2001.

FIELD OF THE INVENTION

This invention relates generally to a chiller tank system and method for chilling liquids. More specifically, this invention relates to the containment of liquids within a tank and the method for maintaining the liquids within a specific temperature range.

BACKGROUND OF THE INVENTION

Apparatus and methods for keeping liquids cool, beverages or water for example, are well known. However, the storage of liquefied gases can be problematic if the gases are corrosive or otherwise potentially hazardous. The liquefied gas must be maintained at a temperature below vaporization temperature and handled safely to avoid releases of the hazardous gas.

Generally, prior apparatus for keeping liquids below a certain temperature fall into one of two categories: cooling apparatus using a thermoelectric device for reducing the temperature of liquids and beverage cooling apparatus, beer kegs, for example, using chilled fluids flowing through pipes within the kegs or storage containers. Merckel, in U.S. Pat. No. 2,376,373 discloses a brew cooling device comprising one or more open pockets made of metal shells that are positioned within the kegs. Water or other cooling fluids are circulated through the pocket by way of inlet and outlet ducts. The pocket further comprises a flow guide insert that compels the cooling fluid to pass through the depth or length of the pocket. Stanfill in U.S. Pat. No. 4,730,463 and Murray et al. in U.S. Pat. No. 1,962,322 disclose other beverage cooling systems using chilled liquid lines for cooling the brews. The '322 reference teaches chilling coils extending into the beverage storage tank and the '463 reference discloses a chilled liquid line parallel to the beverage conduit lines for chilling beverages wherein the dispensing system is remote from the storage site.

The majority of the remaining patents relate to cooling apparatus using a thermoelectric device connected to a cooling or chiller probe. Moren, Pat. No. 5,544,489 reveals a dispensing apparatus for a cooled liquid using a thermally conductive probe. A thermoelectric device produces a reduced temperature on a first side and a raised temperature on a second side when a direct voltage is applied to the device. The thermally conductive probe is in direct physical contact with the first surface of the thermoelectric device. A heat sink is adjacent the second surface for dissipating heat thereby reducing the temperature. This arrangement transfers thermal energy between the thermoelectric device and the liquid to be cooled.

U.S. Pat. No. 6,131,393 to Greene discloses an apparatus for cooling of stored water. A chilling chamber is connected to a water reservoir. The water to be cooled flows through a tube within the chilling chamber. The tube is coiled about a chilling probe which is connected to a thermoelectric device. The thermally conductive probe cools the heat transfer medium (water) within the chilling chamber which in turn cools the water within the coiled tube. One end of the coiled tube is connected to a faucet for dispensing the cooled water. Yamagishi et al., U.S. Pat. No. 4,977,953 teaches a latent heat regenerating apparatus using a thermoelectric cooling element to control supercooling of latent heat regenerating material for use in air conditioners which combine a refrigeration cycle capable of both cooling and heating operations.

A cryogenic liquid level measuring apparatus and probe are taught by Samuels et al. in U.S. Pat. No. 4,020,690. The liquid level in a vessel of cryogenic liquid is determined indicated by a sensing probe. None of the above-referenced disclosures discuss or resolve the problem of maintaining a uniformly chilled liquid within a tank to avoid warm spots and the resulting vaporization of volatile liquids.

SUMMARY

The present invention advantageously comprises a chiller tank system for containing volatile liquids at a temperature below its vaporization point and at ambient pressure. Vaporization of the volatile liquid is reduced in two ways, first by utilizing an insulated tank to maintain lower temperatures and second, by positioning a chiller barrel vertically within the tank for continued chilling of the liquid without thermal stratification that occurs in systems having coiled tubes in one area of the system. The vertically positioned chiller barrel chills the liquid uniformly throughout the tank thereby avoiding thermal stratification which, in turn, minimizes vaporization.

One preferred embodiment of a chiller tank system for containment of chilled liquids comprises a first tank and a second tank positioned within the first tank. The first tank can be spaced apart from the second tank so that insulation material can be positioned between the first and second tank. The second tank defines a chamber for receiving the liquid to be chilled. The potentially volatile liquid can comprise aqueous ammonia, sodium hypochlorite, or organic solvents. The second tank can comprise a top, preferably a domed top, and a bottom for sealing the chamber. Preferably, a refrigeration unit supplies inert refrigerant to the tank. A flexible, dual hose can circulate refrigerant between the refrigeration unit and the second tank, the dual hose comprising an inner hose within an outer hose. The outer hose is concentric to and spaced apart from the inner hose thereby creating two channels, one for transporting the refrigerant to the tank and the other for transporting the refrigerant away from the tank.

In one aspect, a straight-lined, chiller barrel is preferably positioned vertically within the chamber. The chiller barrel defines a bore and is detachably connected to the dual hose for receiving the refrigerant. The straight-lined chiller barrel extends downward into the tank through an opening in the top of the tank. Because it is vertical within the tank, the chiller barrel evenly chills the liquid within the tank thereby avoiding thermal stratification that causes vaporization by creating warm spots within the liquid. The straight-lined chiller barrel preferably has a first end portion extending outwardly through the top of the second tank and connected to a support plate. A second end portion of the chiller tank is preferably adjacent the bottom of the second tank to provide even chilling of the liquid contents of the tank. The second end portion can comprise a closed or sealed end and the first end portion defines an opening into the bore. In another preferred embodiment, the chiller barrel comprises a tube positioned concentrically within its bore so that the bottom of the tube is adjacent the second end. The top of the tube extends outwardly from the chiller barrel and is connected to the outer hose of the dual hose while the inner hose extends into the tube until it is deflected into the bore of the chiller barrel. The refrigerant is transported from the refrigeration unit through the dual hose to the chiller barrel and is circulated within the chiller barrel so that the refrigerant absorbs heat from the surrounding liquid.

Preferably the chiller tank system is vented to the atmosphere by at least one vent line extending outwardly from the top of the tank. In another aspect of this invention, the tank further comprises a metering pump, a first vent extending from the top of the system and a second vent release line between the first tank and the metering pump to avoid cavitation [vapor lock.] The top of the second tank defines an opening sealable with a lid for checking contents of the tank and removing the chiller barrel. A temperature probe can also be positioned within the chamber, the temperature probe extending outwardly from the top for readability.

In one aspect, the dual hose defines two pathways for transport of the refrigerant to and from the refrigeration unit. The inner hose defines a channel as one of the pathways and an inside wall of the outer hose defines a conduit so that the inner hose can transport refrigerant in one direction and the outer hose transports refrigerant in an opposite direction. In one preferred embodiment, the inner hose is extended through tube, preferably a suction tube, and out into the bore of the chiller barrel so that refrigerant circulates through the bore thereby providing substantially uniform temperature throughout liquid within the chiller tank. The refrigerant returns to the dual hose and refrigeration unit by means of the suction tube.

An inlet pipe transports liquid into the second tank and an outlet pipe transports chilled liquid out of the second tank. A housing facility can house the tanks and refrigeration unit minimizing exposure to escaped gases if it occurs. Preferably, the vent lines extend outside of the housing facility to the atmosphere and the inlet and outlet pipes extend outside of the housing facility.

In one embodiment, the inert refrigerant is freon. Preferably, the dual hoses are flexible hoses and the refrigeration unit and the flexible hoses are precharged with freon so that the task of recharging the refrigeration system can be accomplished easily and can be performed in the field. The refrigeration unit, flexible hoses and the chiller barrel can be integral and the chiller barrel removable from the chiller tank. When the refrigerant is consumed, it is a simple matter to remove the chiller barrel, hoses and refrigeration unit and replace them with another charged system. To prevent vaporization of the liquid it is preferably to maintain the temperatures greater than 5° C. below boiling point of the liquid. The pressure inside the chamber can be ambient pressure.

DETAILED DESCRIPTION OF THE INVENTION

The chiller tank system of the present invention stores and contains volatile liquids at a temperature below the liquid's vaporization point and at ambient pressure. Volatile substances are easier to contain and transport in a liquid form rather than in a gaseous state, which often requires pressurized containment tanks. Chilling liquefies these volatile chemicals. Vaporization of potentially caustic or hazardous liquids is reduced according to the practice of this invention by utilizing an insulated tank system to maintain lower temperatures and by positioning a chiller barrel vertically within the tank for continued chilling of the liquid without creating warm spots within the tank. The vertically positioned chiller barrel chills the liquid more uniformly within the tank avoiding thermal stratification which, in turn, minimizes vaporization. A flexible dual hose connects the chiller barrel to a refrigeration unit. Advantageously, if recharging is necessary, the chiller barrel, dual hose and refrigerator unit assembly can be removed from the tank system and replaced with a factory-charged assembly by workers in the field without having a licensed EPA refrigeration specialist on site.

Figure 1:
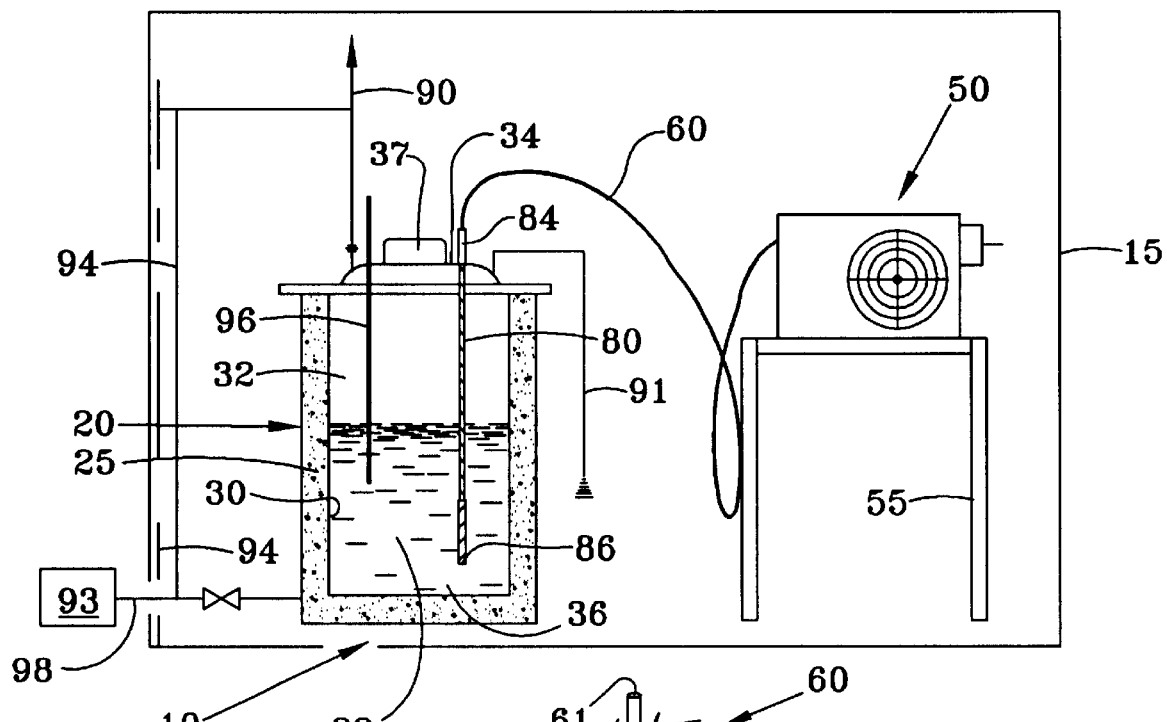
FIG. 1 is a schematic of one embodiment of this invention illustrating the vertical chiller barrel with a chiller tank.
Figure 2:
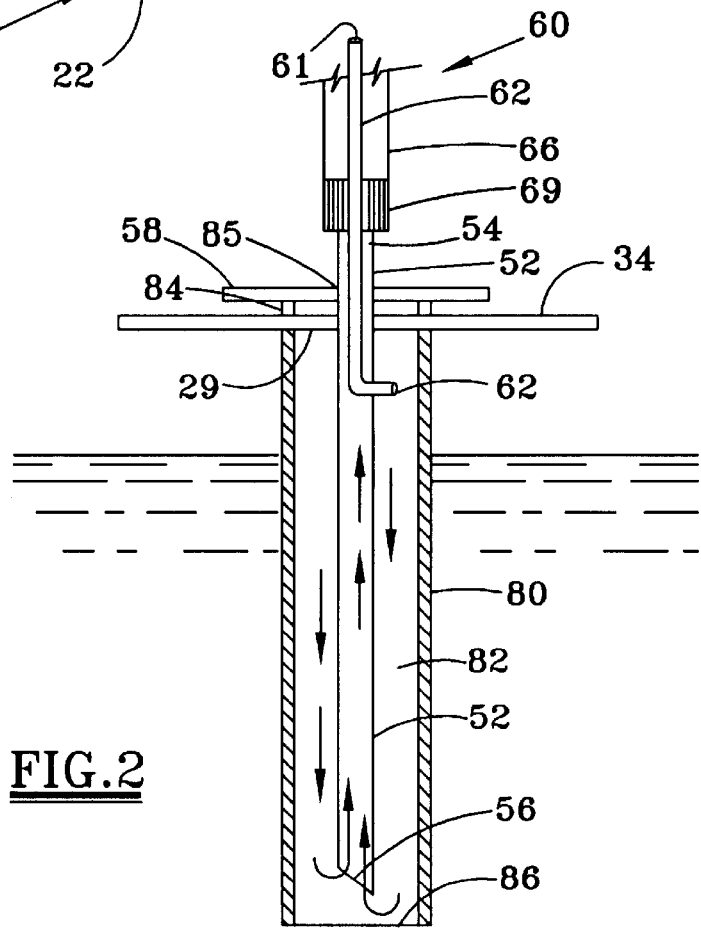
FIG. 2 is a cross section of the chiller barrel and dual hose.
Figures 3, 4:
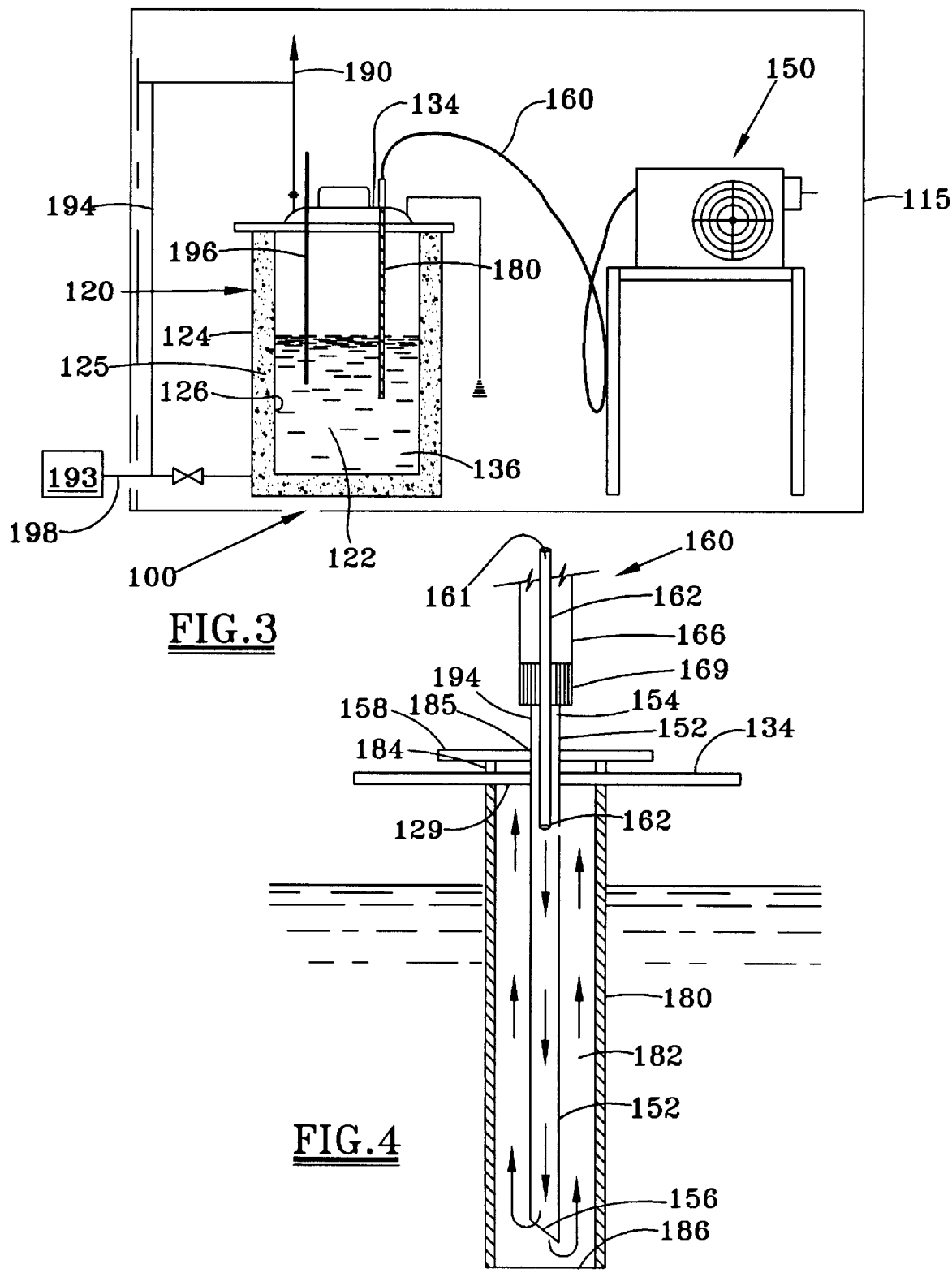
FIG. 3 is a schematic of another embodiment of this invention illustrating the vertical chiller barrel within a chiller tank.
FIG. 4 is another embodiment of a cross section of the chiller barrel and dual hose.

Referring to FIGS. 1 and 2, one preferred embodiment of a chiller tank system 10 for containment of chilled liquids comprises at least two containment tanks, a first tank 20 and a second tank 30 position within the first tank 20. The first tank 20 can be spaced apart from the second tank 30 so that insulation material 25, heat insulation foam for example, can be positioned between the first 20 and second tank 30 to maintain cooler temperatures within the tank. Preferably, the containment tanks 20, 30 are manufactured from high density polyethylene. The size and shape of the tanks are well known in the industry. The two-tank system is a fail safe device wherein the outer tank 20 can contain the corrosive or potentially hazardous vapors or liquids if the inner tank 30 leaks or ruptures. In an alternative embodiment of this invention, as illustrated in FIG. 3, the tank system 120 comprises a double-walled tank 121, an outer wall 124 and an inner wall 126 spaced apart from the outer wall 124 so that insulation material 125 is positioned between the two walls 124, 126.

As shown in FIG. 1, the second or inner tank 30 of the two-tank system defines a chamber 32 for receiving the liquid to be chilled. Various potentially volatile liquids can be contained by the chiller tank system of this invention, aqueous ammonia, sodium hypochlorite or organic solvents for example. For purposes of this description of the invention, the liquid is aqueous ammonia, an ammonium hydroxide solution. Aqueous ammonia is a caustic solution and can be hazardous to persons in contact with it. Sodium hypochlorite, commonly known as bleach, is also caustic and harmful if vaporized into chlorine. The double tank system of this invention is one of the precautions used in handling the aqueous ammonia, other precautions will be noted below.

As shown in FIG. 1, the second tank 30 comprises a top 34, preferably a domed top as illustrated, and a bottom 36 for sealing the chamber 32. The top 34 of the second tank 30 defines an opening or manhole sealable with a lid 37 for checking contents of the tank 30 and removing the chiller barrel 80 when necessary. The chiller tank system 10 can be housed within an enclosure or housing facility 15 to protect it from the elements. The preferred chiller tank system 10 comprises several safe guards to prevent venting or leaking of any caustic liquid or gas within the housing 15. In addition to the dual walled system, the chiller tank system 20, 30 is vented outside of the housing facility 15 directly to the atmosphere so that any vapors that may form can be safely removed from possible human exposure. One preferred embodiment comprises at least one vent line 90 having a first end in the head area above the liquid level in the tank 30 and a second end extending outwardly from the top of the tank 34 to the outside of the housing facility 15 into the atmosphere where small amounts of the vapor can safely be released. The inlet pipes 91 and outlet pipes 98 that transport the liquid to and from the chiller tank system 10 also extend outside of the housing facility 15 to prevent possible human exposure to noxious vapors.

In another aspect of this invention 10, the tank system further comprises a metering pump 93. One embodiment comprises a flooded suction pump 93 that makes use of gravity to pump the liquid from the tank 30. A second vent release line 94 is preferably located between the piping 98 and the metering pump 93 to avoid cavitation or vapor lock which can cause mechanical damage to the pump 93 and piping 98 as well as interrupt the flooded suction pumping because of air or vapor bubbles that form. The vapor bubbles are released into the second vent line 94 before reaching the pump 93. Preferably, the second vent 94 is a clear, equilibrium vent line so that the level of the liquid within the second tank 30 can be determined. Maintaining the volatile liquid below its boiling point is important in preventing vaporization. A temperature probe can also be positioned within the chamber 32 to measure the temperature of the liquid at all times. Preferably, the temperature probe extends outwardly from the top 34 for readablility. The boiling point of aqueous ammonia is approximately 83° F. (28° C.); the temperature of the liquid within the chiller tank 30 is below 65° F. (18° C.) and preferably below approximately 60° F. (15° C.) to prevent vaporization. Other liquids have varying boiling points therefore the preferred temperature within the tank 30 depends on the nature of the liquid being contained. In one aspect, the temperature probe can include an alarm to notify an operator when the temperature goes above a set point. Since the volatile chemical is maintained in a liquid state, the chiller tank system 10 of a preferred embodiment of this invention can operate at ambient pressure thereby lowering costs of containment.

In one preferred embodiment as illustrated in FIGS. 1 and 2, the refrigeration assembly for the tank system 20, 30 comprises a refrigeration unit 50 or condenser outside of the tank system, a chiller barrel 80 positioned vertically within the liquid to be chilled and an insulated dual hose 60 to transport an inert refrigerant, freon for example, between the refrigeration unit 50 and the chiller barrel 60. The refrigeration assembly is a self-contained unit that avoids leakage of freon, even when removed from the chiller tank system. Refrigeration units 50 are well known to those in the art and preferably are supplied to the tank site pre-charged with refrigerant. Alternatively, because the entire refrigeration assembly, chiller barrel, dual hose and refrigerator unit, form a self-contained unit, it can be removed from the tank system and replaced with a factory charged assembly by field workers without requiring an EPA expert on site. Advantageously, the removal of the refrigeration assembly for recharging and replacement with a pre-charged assembly can be performed in less than one hour.

The dual hose 60 comprises an inner hose 62 within an outer hose 66, the outer hose 66 concentric to and spaced apart from the inner hose 62 thereby creating two pathways 61, 63, for transporting the refrigerant between the refrigeration unit 50 and the tank 30. One hose transports the refrigerant in one direction and the other transports the refrigerant in the opposite direction as shown by the arrows in FIGS. 2 and 4. The direction shown in FIGS. 2 and 4 illustrate that the directional flows within the hoses are interchangeable although the directional flow of FIG. 2 is preferred so that the refrigerant is kept cooler within the inner hose and than transported to the bore 82 of the chiller barrel for more efficient cooling of the surrounding liquid. The inner hose 62 defines a channel 61 and the outer hose 66 comprises an inner wall 66a and an outer wall 66b, preferably insulated. The inner wall 66a defines a pathway or conduit 63 for transporting refrigerant. Preferably, the dual hoses are flexible hoses, i.e. manufactured from materials that are flexible as opposed to hard piping. In one preferred embodiment, the outer hose is manufactured from rubber and the inner hose is made from flexible copper tubing. Flexible hoses are more portable because they can be rolled. The flexibility allows easy replacement of the hoses along with the rest of the refrigeration assembly by the tank system operator if the assembly has to be recharged.

In one aspect, a straight-lined, chiller barrel 80 is preferably positioned vertically within the chamber 32. By positioning the chiller barrel 80 vertically, liquid throughout the chamber 32 is chilled to the desired temperature for preventing vaporization without thermal stratification that causes warm spots as associated with chilling units that are coiled and placed on the bottom of the tank. The upper portion of the elongated chiller barrel 80 extends above the level of the liquid within the second tank 30. As liquid vaporizes, heat energy is absorbed by the gas according to the liquid's heat of vaporization. This phenomenon causes the upper portions of the chiller barrel 80 to be icy cold. As the vapor or gas moves up along the chiller barrel above the level of the liquid, the loss of heat energy due to vaporization along with the icy chiller barrel lowers the temperature of the gas to a point at which the gas returns to its liquid state. Even if the refrigeration unit fails or is turned off, the phenomenon of heat loss due to vaporization, the insulated tank system and the icy cold chiller work together to maintain the cool temperature thereby reducing vaporization.

Preferably, the chiller barrel 80 defines a bore 82 for receiving the dual hose 60. As illustrated in FIGS. 1 and 3, the straight-lined chiller barrel 80 extends vertically downward into the second tank 30. The chiller barrel 80 can be detachably connected to the dual hose 60 for receiving the refrigerant. In one embodiment, a compression fitting 69 connects the dual hose to the chiller barrel 80.

The straight-lined chiller barrel 80 extends downward into the tank 20 through an opening 34 in the top of the second tank 30. Because it is vertical within the tank 20, the chiller barrel 80 evenly chills the liquid within the tank 20 thereby avoiding thermal stratification that causes vaporization by creating warm spots within the liquid. The straight-lined chiller barrel 80 preferably has a first end portion 84 extending outwardly through the top of the second tank 34 and is connected to a support plate 96. A second end portion 86 of the chiller barrel is preferably adjacent the bottom of the second tank 36 to provide even chilling of the liquid contents 22 of the tank when refrigerant is circulated through the chiller barrel 80. The second end portion 86 is preferably a sealed end to provide a closed path for the circulating refrigerant. The first end portion 84 defines an opening into the bore 82 and is fixedly attached to the support plate 96 above the top 34 of the tank.

Preferably, the chiller barrel 80 comprises a tube 52 positioned concentrically within its bore 82 so that the bottom 56 of the tube 52 is adjacent the second end 86. Preferably, the tube 52 is a suction tube. The top of the tube 54 extends outwardly from the chiller barrel 80 through an opening in the support plate 58 and is connected to the outer hose 66 of the dual hose 60 system by the comprssion fitting 69 while the inner hose 62 extends into the suction tube 52. In one preferred embodiment as seen in FIG. 2, the inner hose 62 is deflected out of the tube 52 into the bore 82 of the chiller tank 80 so that the chilled refrigerant travels from the refrigeration unit 50, through the inner hose 62 and into the bore 82 of the chiller barrel 80 to provide the coldest refrigerant to chill the liquid in the tank 30. Alternatively, the inner hose 62 can extend through the tube 52 so that the chilled refrigerant is transported through the outer hose 66, into the chiller barrel 80 and back to the refrigeration unit 50 by means of the inner hose 62. The refrigerant is circulated from the refrigeration unit 50 through the dual hose 60 to the chiller barrel 80. The refrigerant is then circulated within the chiller barrel 80 so that the refrigerant is adapted to absorb heat from the surrounding liquid thereby allowing substantially uniform temperatures throughout the liquid within the chiller tank 20.

The refrigeration system 50, 60, 80 of a preferred embodiment of this invention is adapted to maintain a temperature that avoids vaporization of the liquid. In the example of aqueous ammonia, the temperature is maintained below 60° F. When at temperatures below vaporization, accidental venting should not occur. If vaporization does occur, it will proceed at a slow pace because of the low temperature. The rate of vaporization is directly proportional to the rate that energy can be gained by the liquid from the surrounding environment to offset the chilling effect. The tank is insulated to indirectly control the rate of vaporization by limiting the heat energy available to the liquid.

A head exists between the liquid level and domed roof of the tank. Some temperature stratification may take place in that area. The very upper portions of the liquid may be slightly warmer than the bottom portions. Vaporization that does take place is slower and venting or rapid release typically does not occur because of the ambient pressure within the tank and the insulation provided which limits the energy available to the tank. If vaporization does occur, the upper portion of the chiller barrel 80, which is colder than the portion within the liquid, absorbs heat from the vapor causing the gas to revert to its liquid state.

In case of a shut down or failure of the refrigeration system, several unique aspects of this invention including the chiller barrel 80, the double-walled insulated tank system 20, 120 and the insulted dual hoses 60, work together to reduce vaporization. The insulated walls of the tank help to maintain the low temperatures of the tank so that the temperature rises above the boiling point at a very slow rate. Also, the pressure within the tank is low because the tank is maintained at ambient pressure therefore reducing the occurrence of a rapid release. All of these factors work together so that massive rapid releases of vapor are avoided.

In one embodiment, the inert refrigerant is freon. Preferably, the dual hoses 60 are flexible hoses 60 which can be easily rolled into a compact unit and the refrigeration unit 50 and the flexible hoses 60 are pre-charged with freon. The refrigeration unit 50, flexible hoses 60 and the chiller barrel 80 are preferably an integral assembly. The chiller barrel can easily be removed from the chiller tank 30 by means of the manhole 37 within the top 34 of the tank 30. When the refrigerant is consumed, it is a simple matter to remove the chiller barrel 80, hoses 60 and refrigeration unit 50 as a single, integral assembly to replace them with another factory-charged assembly 50, 60, 80. The entire assembly is removed from the tank 20, rolled up and sent back to the factory for recharging. Typically, a field worker can remove the refrigeration assembly and replace it with another pre-charged assembly without the need of an EPA refrigeration specialist because the difficult process of on-site recharging, with the possibility of leaking freon, is avoided.

In another preferred embodiment of the chiller tank system for containment of chilled liquids 100 as illustrated in FIGS. 3 and 4, the chiller tank comprises a double walled tank 120. The double wall comprises an inner wall 126 and an outer wall 124 spaced apart from the inner wall 126; insulation material 125 can be positioned between the outer wall 124 and the inner wall 126. The inner wall 126 can define a chamber 122 for receiving liquid to be chilled. A top 134 adjacent the inner wall above the chamber 122 and a bottom 136 seals the chamber 122. The top preferably comprises at least one vent line extending outwardly from the top to the atmosphere. A refrigeration unit 150 supplys inert refrigerant to the tank 120 to maintain the temperature approximately below the approximate vaporization temperature. The chamber 122 can be maintained at ambient pressure.

A dual hose 160 circulates refrigerant between the refrigeration unit 150 and the tank 120. In this embodiment, the dual hose 160 comprises an inner hose 162 and an outer hose 166 concentric to the inner hose 162. The inner hose preferably defines a channel. The outer hose 166 can have an inside wall 166a and an outside wall 166b, the inside wall 166a defining a conduit so that the inner hose 162 is positioned within the conduit. A straight-lined, chiller barrel 180, comprising a bore 182 and a tube 152, preferably a suction tube, within the bore 182, is positioned vertically within the chamber 122. The chiller barrel 180, flexible, dual hoses, 160 and refrigeration unit 150 are integral and maintain the temperature within the double walled tank 120 approximately below the vaporization temperature of the liquid within the tank 120 by circulating a refrigerant, freon for example, between the refrigeration unit 150, the dual hoses 160 and the chiller barrel 180.

In one preferred method for chilling a liquid within a chiller tank system, a refrigeration unit and flexible dual hose are pre-charged with a refrigerant. The flexible, pre-charged dual hose is attached to a chiller barrel so that the refrigerant can circulate through the chiller barrel. The chiller barrel with the dual hose is positioned into a double walled, insulated tank or two-tank system containing a liquid that requires chilling. The chiller barrel is positioned so that it is vertical within the insulated, dual tank system and the chiller barrel is extended through the depth of the tank. Refrigerant from the refrigeration unit is circulated through the flexible hoses and the chiller barrel so that the liquid within the tank is chilled substantially uniformly throughout the depth of the tank. Preferably, the tank is maintained at a temperature within a range that is below the vaporization temperature of the liquid within the tank and at ambient pressure. The tank system is vented to the atmosphere by at least one vent release line at the top of the tank and one or more vent release lines between the tank and the metering pump.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A chiller tank system for containment of chilled liquids, the chiller tank system comprising:
   a first tank;
   a second tank positioned within the first tank, the second tank defining a chamber for receiving liquid to be chilled;
   the second tank comprising a top and a bottom for sealing the chamber;

a refrigeration unit for supplying an inert refrigerant to the tank;

a dual hose for circulating the refrigerant between the refrigeration unit and the second tank, the dual hose comprising an inner hose within an outer hose, the outer hose concentric to and spaced apart from the inner hose;

a straight-lined, chiller barrel positioned vertically within the chamber, the chiller barrel defining a bore;

the straight-lined chiller barrel having a first end portion extending outwardly through the top of the second tank and a second end portion adjacent the bottom of the second tank, the chiller barrel detachably attached to the dual hose so that the refrigerant is circulated through out the chiller barrel.

2. The chiller tank system of claim 1 wherein the second tank is adapted to contain a liquid selected from a group consisting of aqueous ammonia, sodium hypochlorite, and organic solvents.

3. The chiller tank system of claim 1 further comprising at least one vent line extending outwardly from the top.

4. The chiller tank system of claim 1 wherein the chiller barrel comprises a tube positioned within the bore, the tube extended within the chiller barrel until it is adjacent the second end portion of the chiller barrel, the tube fitted to the outer hose so that the refrigerant is transported through the tube in one direction and through the bore in an opposite direction.

5. The chiller tank system of claim 1 wherein the inner hose defines a channel, the outer hose has an inside wall and an outside wall, the inside wall defining a conduit so that the channel of the inner hose transports refrigerant in one direction and the conduit of the outer hose transports refrigerant in an opposite direction.

6. The chiller tank system of claim 1 further comprising a temperature probe positioned within the chamber, the temperature probe extending outwardly from the top.

7. The chiller tank system of claim 1 wherein the top defines an opening sealable with a lid.

8. The chiller tank system of claim 1 comprising a metering pump, a first vent extending from the top of the system and a second vent release line between the first tank and the metering pump.

9. The chiller tank system of claim 8 further comprising an inlet pipe to transport liquid into the second tank and an outlet pipe to transport chilled liquid out of the second tank.

10. The chiller tank system of claim 9 further comprising a housing facility for housing the tanks and refrigeration unit, wherein the vent lines extend outside of the housing facility to the atmosphere and the inlet and outlet pipes extend outside of the housing facility.

11. The chiller tank system of claim 1 wherein the inert refrigerant is freon.

12. The chiller tank system of claim 11 wherein dual hoses are flexible hoses and the refrigeration unit and the flexible hoses are precharged with freon.

13. The chiller tank system of claim 12 wherein the refrigeration unit, flexible hoses and the chiller barrel form an integral assembly and the chiller barrel is removable from the chiller tank.

14. The chiller tank system of claim 1 wherein the temperature within the chamber is maintained approximately below the vaporization temperature of any liquid within the tank.

15. The chiller tank system of claim 1 wherein the temperature within the chamber is maintained below approximately 60° F.

16. The chiller tank system of claim 1 wherein the pressure inside the chamber is ambient pressure.

17. A chiller tank system for containment of chilled liquids, the chiller tank system comprising:

a first tank;

a second tank position within the first tank, the first tank spaced apart from the second tank, insulation material positioned between the first tank and the second tank, the second tank defining a chamber for receiving liquid to be chilled;

the second tank comprising a top and a bottom for sealing the chamber;

at least one vent line extending outwardly from the top;

a refrigeration unit for supplying inert refrigerant to the tank, the temperature within the chamber adapted to maintain any liquid within the tank below the approximate temperature of vaporization;

the chiller tank system maintained at ambient pressure;

a flexible, dual hose for circulating refrigerant between the refrigeration unit and the second tank, the dual hose comprising an inner hose within an outer hose, the outer hose concentric to and spaced apart from the inner hose, the inner hose defining a channel and the outer hose having an inside wall and an outside wall, the inner wall defining a conduit;

a straight-lined, chiller barrel positioned vertically within the chamber and extending out of the top, the barrel defining a bore, the barrel having a first end portion extending outwardly through the top and a second end portion adjacent the bottom of the second tank, the chiller barrel comprising a suction tube, the second end portion comprising a closed end, the first end portion defining an opening into the bore, the suction tube sealably connected to the outer hose, the inner hose extending into the suction tube and deflected out into the bore so that the dual hose transports the chilled refrigerant into the barrel through the inner hose, the refrigerant is circulated throughout bore of the chiller barrel and transported back to the refrigeration unit through the outer hose.

18. The chiller tank system of claim 17 further comprising a temperature probe positioned within the chamber, the temperature probe extending outwardly from the top.

19. The chiller tank system of claim 17 further comprising an inlet pipe to transport liquid into the second tank and an outlet pipe to transport chilled liquid out of the second tank.

20. The chiller tank system of claim 17 further comprising a housing facility for housing the tanks and refrigeration unit, wherein the vent lines extend outside of the housing facility to the atmosphere and the inlet and outlet pipes extend outside of the housing facility.

21. The chiller tank system of claim 17 wherein the refrigeration unit comprises flexible hoses and the refrigeration unit and flexible hoses are pre-charged with freon.

22. The chiller tank system of claim 21 wherein the refrigeration unit, flexible hoses and chiller barrel are an integral assembly and the chiller barrel is removable from the chiller tank.

23. A chiller tank system for containment of chilled liquids, the chiller tank comprising:

a double walled tank comprising an inner wall and an outer wall spaced apart from the inner wall, the inner wall defining a chamber adapted to receive liquid to be chilled;

a top adjacent the inner wall above the chamber for sealing the chamber and a bottom;

a refrigeration unit for supplying inert refrigerant;

a dual hose for circulating refrigerant between the refrigeration unit and the tank, the dual hose comprising an inner hose and an outer hose concentric to the inner hose;

a straight-lined, chiller barrel positioned vertically within the chamber, the barrel defining a bore, the barrel comprising a suction tube;

the barrel having a first end portion extending through the top and a second end portion adjacent the bottom of the tank, the second end portion comprising a closed end, the first end portion defining an opening into the bore, the chiller barrel sealably connected to the outer hose, the inner hose extending into the bore so that the refrigerant is circulated throughout the chiller barrel.

24. The chiller tank system of claim 23 further comprising at least one vent line extending outwardly from the top.

25. The chiller tank system of claim 23 further comprising a temperature probe positioned within the chamber, the temperature probe extending outwardly from the top.

26. The chiller tank system of claim 23 wherein the top defines an opening sealable with a lid.

27. The chiller tank system of claim 23 comprising a metering pump, a first vent extending from the top of the tank and a second vent release line between the tank and the metering pump.

28. The chiller tank system of claim 27 further comprising an inlet pipe to transport liquid into the tank and an outlet pipe to transport chilled liquid out of the tank.

29. The chiller tank system of claim 28 further comprising a housing facility for housing the tank and refrigeration unit, wherein the vent lines extend outside of the housing facility to the atmosphere and the inlet and outlet pipes extend outside of the housing facility.

30. The chiller tank system of claim 23 wherein the refrigeration unit comprises flexible hoses and refrigeration unit and the flexible hoses are pre-charged with freon.

31. The chiller tank system of claim 30 wherein the refrigeration unit, flexible hoses and chiller barrel are an integral assembly and the chiller barrel is removable from the chiller tank.

32. The chiller tank system of claim 23 wherein the temperature within the chamber is maintained below the approximate vaporization temperature of the liquid.

33. The chiller tank system of claim 23 wherein the temperature within the chamber is maintained below approximately 60° F.

34. The chiller tank system of claim 23 wherein the pressure inside the chamber is ambient pressure.

35. A chiller tank system for containment of chilled liquids, the chiller tank comprising:

a double walled tank comprising an inner wall and an outer wall spaced apart from the inner wall, insulation material positioned between the outer wall and the inner wall, the inner wall defining a chamber for receiving liquid to be chilled;

a top adjacent the inner wall above the chamber for sealing the chamber and a bottom, the top comprising at least one vent line extending outwardly from the top;

a refrigeration unit for supplying inert refrigerant to the tank to maintain the temperature approximately below the vaporization temperature of the liquid;

the chamber maintained at ambient pressure;

a flexible, dual hose for circulating refrigerant between the refrigeration unit and the tank, the flexible, dual hose comprising an inner hose and an outer hose concentric to the inner hose, the outer hose having an inside wall and an outside wall, the inside wall defining a conduit and the inner hose positioned within the conduit;

a straight-lined, chiller barrel positioned vertically within the chamber, the chiller barrel defining a bore, the chiller barrel comprising a tube within its bore, the chiller barrel further comprising a first end portion and a second end portion;

the tube extending through the top, the second end portion of the chilled barrel adjacent the bottom of the tank, the second end portion comprising a closed end, the tube sealably connected to the outer hose, the inner hose extending into through the tube and deflected into the bore, so that the refrigerant enters the barrel through one hose of the dual hose, travels through the chiller barrel and returns to the refrigeration unit through the other hose.

36. The chiller tank system of claim 35 further comprising an inlet pipe to transport liquid into the tank and an outlet pipe to transport chilled liquid out of the tank.

37. The chiller tank system of claim 35 further comprising a housing facility for housing the tank and refrigeration unit, wherein the vent lines extend outside of the housing facility to the atmosphere and the inlet and outlet pipes extend outside of the housing facility.

38. A chiller tank system for containment of chilled aqueous ammonia, the chiller tank system comprising:

a first tank;

a second tank position within the first tank, the first tank spaced apart from the second tank, insulation material positioned between the first tank and the second tank, the second tank defining a chamber for receiving liquid to be chilled;

the second tank comprising a top for sealing the chamber and a bottom;

at least one vent line extending outwardly from the top;

a refrigeration unit for supplying inert refrigerant to the tank, the temperature within the chamber maintained below approximately 65° F.;

the chiller tank system maintained at ambient pressure;

a dual hose for circulating refrigerant between the refrigeration unit and the second tank, the dual hose comprising an inner hose within an outer hose, the outer hose concentric to and spaced apart from the inner hose;

a straight-lined, chiller barrel positioned vertically within the chamber, the chiller barrel defining a bore, the chiller barrel having a first end portion extending outwardly through the top and a second end portion comprising a closed end, the chiller barrel further comprising a tube positioned within the bore, the tube sealably connected to the outer hose, the inner hose extending into the tube and deflected into the bore so that the refrigerant enters the barrel through the one hose, circulates through the barrel and is transported back to the refrigeration unit by the other hose;

the second end of the chiller barrel positioned adjacent the bottom of the second tank and the tube extending within the chiller barrel until it is adjacent the second end portion of the chiller barrel for substantially uniform temperature throughout liquid within the chiller tank.

39. A method for chilling a liquid with a chiller tank system, the method comprising:

pre-charging a refrigeration unit and flexible duel hose with a refrigerant;

attaching the flexible, pre-charged duel hose to a chiller barrel so that the refrigerant can circulate through the chiller barrel inserting the chiller barrel with the duel hose into a tank containing liquid to be chilled;

positioning the chiller barrel so that it is vertical within the tank so that the chiller barrel is extended through the depth of the tank;

circulating the refrigerant from the refrigeration unit through the flexible hoses and through the chiller barrel so that the liquid within the tank is chilled substantially uniformly throughout the depth of the tank;

maintaining the tank at a temperature within a range that is approximately below the vaporization temperature of the liquid;

maintaining the pressure at ambient pressure;

venting the tank to the atmosphere by one vent release line at the top of the tank and a second vent release line between the tank and the metering pump.

40. A chiller tank system for containment of chilled liquids, the chiller tank system comprising:

a first tank;

second tank position within the first tank, the first tank spaced apart from the second tank, insulation material positioned between the first tank and the second tank, the second tank defining a chamber for receiving liquid to be chilled;

the second tank comprising a top and a bottom for sealing the chamber;

a refrigeration unit for supplying inert refrigerant to the tank;

a dual hose for circulating refrigerant between the refrigeration unit and the second tank, the dual hose comprising an inner hose within an outer hose, the outer hose concentric to and spaced apart from the inner hose;

a straight-lined, chiller barrel positioned vertically within the chamber, the chiller barrel defining a bore;

the straight-lined chiller barrel having a first end portion and a second end portion adjacent the bottom of the second tank, the second end portion comprising a closed end, the first end portion connected to the outer hose, the inner hose extending into the bore so that the refrigerant is circulated from the refrigeration unit, through the inner hose and into the bore of the chiller, and back to the refrigeration unit through the outer hose.

* * * * *